Dec. 12, 1933. G. B. NICHOLS ET AL 1,939,629
FESTOONING RACK
Filed June 22, 1931 4 Sheets-Sheet 1

INVENTORS
George B. Nichols,
Oscar L. Flener,
& Horace D. Stevens
BY Ely D Barrow
ATTORNEYS Dec. 12, 1933.  G. B. NICHOLS ET AL  1,939,629
FESTOONING RACK
Filed June 22, 1931   4 Sheets-Sheet 2

INVENTORS
George B. Nichols,
Oscar L. Flener,
& Horace D. Stevens
BY
Ely & Barrow
ATTORNEYS Dec. 12, 1933.　　　G. B. NICHOLS ET AL　　　1,939,629
FESTOONING RACK
Filed June 22, 1931　　　4 Sheets-Sheet 3

INVENTORS
George B. Nichols
Oscar L. Flener
& Horace D. Stevens
BY
Ely D. Barrow
ATTORNEYS Dec. 12, 1933.  G. B. NICHOLS ET AL  1,939,629
FESTOONING RACK
Filed June 22, 1931   4 Sheets-Sheet 4
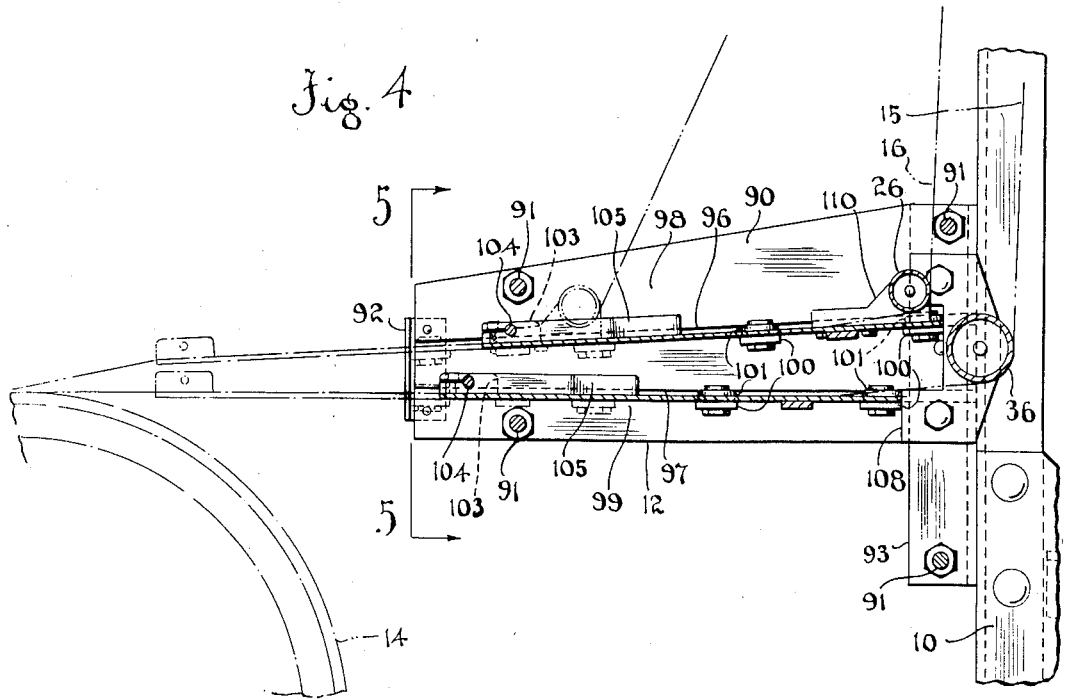
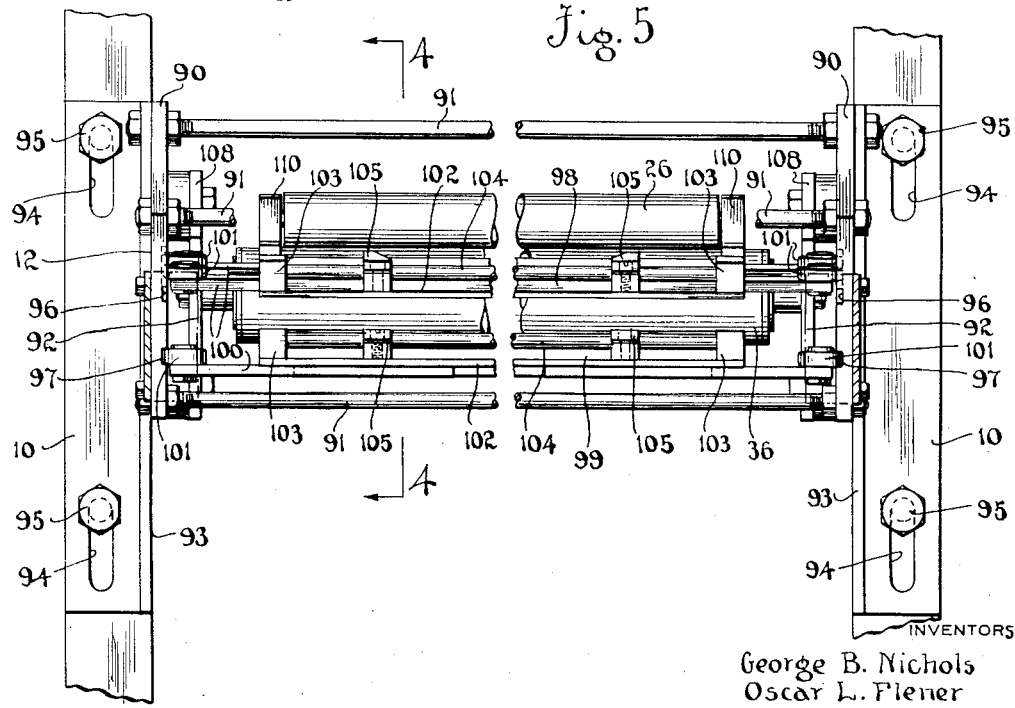
INVENTORS
George B. Nichols
Oscar L. Flener
& Horace D. Stevens
BY
Ely & Barrow
ATTORNEYS Patented Dec. 12, 1933

1,939,629

UNITED STATES PATENT OFFICE 1,939,629

FESTOONING RACK

George B. Nichols, Oscar L. Flener, and Horace D. Stevens, Akron, Ohio, assignors to The Firestone Tire & Rubber Company, Akron, Ohio, a corporation of Ohio Application June 22, 1931. Serial No. 545,898

19 Claims. (Cl. 154—1)

This invention relates to festooning or storage racks such as commonly are used for storing a variable quantity of strip or sheet material, the infeed to and outfeed from the racks being intermittent, and more especially it relates to festooning racks for storing two or more continuous strips of material.

The invention is especially adapted for use in the rubber industry in association with tire building machines for storing continuous strips of tire-building fabric, the strips being formed by splicing shorter length of fabric end to end and feeding them into the rack at one end thereof, and the continuous strips being withdrawn at the other end of the rack and applied to a rotatable tire building form or drum. The provision of a festooning rack for storing two or more continuous strips of material makes possible the carrying of all the fabric required for a tire in a single rack, the respective strips of fabric being of different widths or being bias-cut on different or opposite angles.

The chief objects of the invention are to provide improved guide mechanism for delivering the respective strips of material from the festooning rack to a tire building form; to provide conveniently for the splicing of the respective strips of material and feeding them into the rack; to provide common power means for selectively feeding respective strips into the rack; and to provide strip feeding means adapted automatically to feed a particular strip of material into the rack. Other objects will be manifest.

Of the accompanying drawings:

Figure 4 is a vertical section through the guide mechanism at the delivery end of the apparatus, taken on the line 4—4 of Figure 5; and Figure 5 is a section on the line 5—5 of Figure 4.

Figure 1:
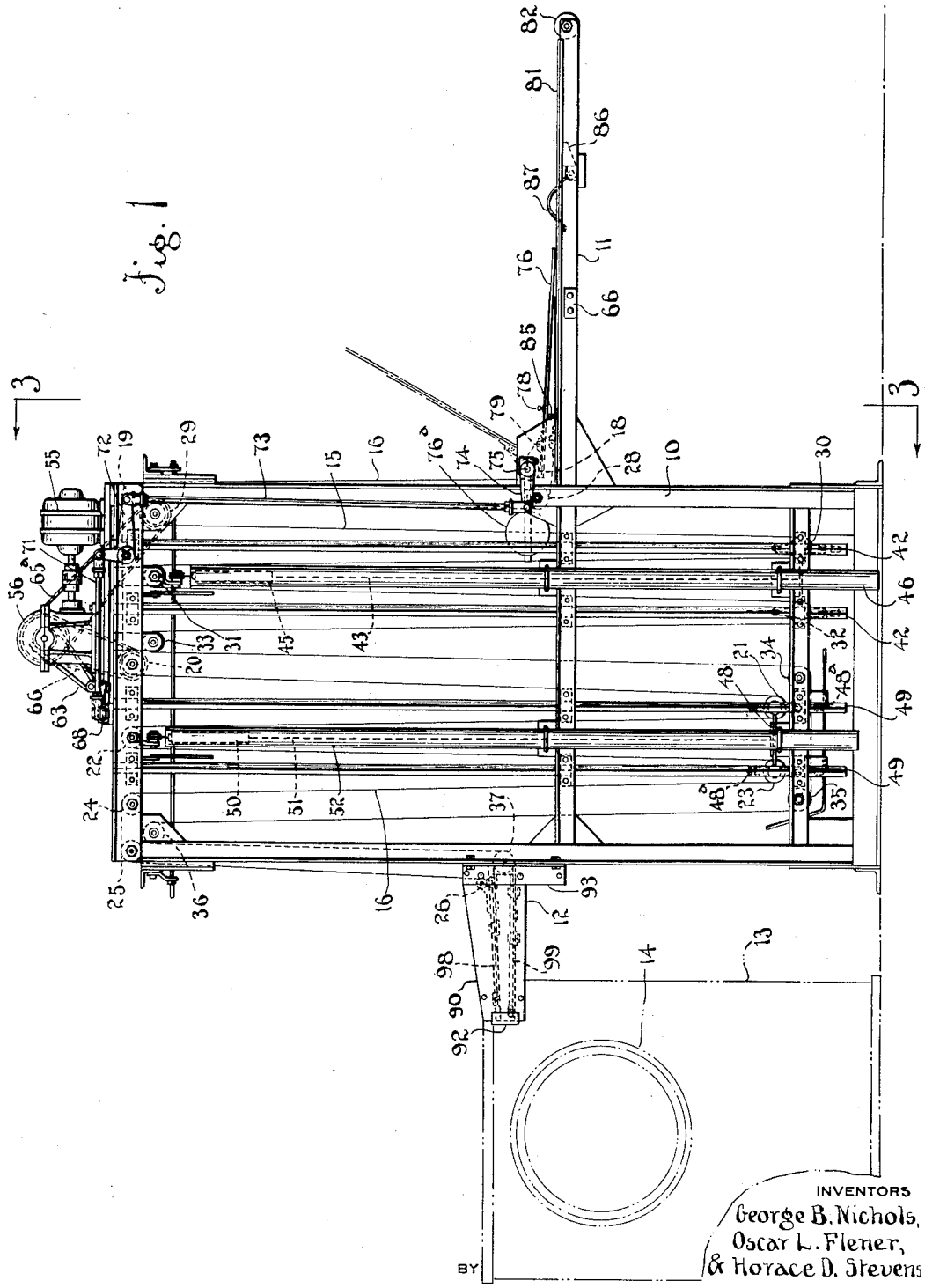
Figure 1 is a side elevation of apparatus embodying the invention in its preferred form.

Referring to the drawings, 10 is an open, upright framework, 11 is a horizontal extension upon the receiving end thereof, 12 is a bracket-like extension upon the delivery end thereof, and 13 is a tire building machine of any desired or known construction, the tire building drum 14 of which is aligned with the frame 10 adjacent the bracket structure 12 on the delivery end of said frame. The festooning rack herein illustrated is arranged for the storage of two continuous strips of bias-cut weftless or weak wefted tire-building fabric, 15, 16 respectively, which strips have their constituent strands disposed at opposite angles.

Mounted in the framework 10 are respective groups of fixed and floating rollers upon which the fabric strips 15, 16 are carried in loops or festoons, one of the fixed rollers of each group being power-driven to feed the strips into their respective festoons. The rollers that carry the fabric strip 16, listed in the order in which they are engaged by said strip, are fixed guide roller 18 mounted adjacent the frame extension 11, fixed roller 19 in the top of the framework 10, driven fixed roller 20 in the top of the framework, floating roller 21, fixed roller 22, in the top of the framework, floating roller 23, fixed rollers 24 and 25 in the top of the framework, and a roller 26 at the delivery end of the apparatus that is laterally movable in a manner presently to be described. In similar manner the strip 15 is carried upon fixed guide roller 28, fixed driven roller 29, floating roller 30, fixed roller 31, floating roller 32, fixed roller 33, fixed rollers 34, 35 journaled near the bottom of the framework below floating rollers 21, 23 fixed roller 36 at the top of the frame, and a roller 37 at the delivery end of the apparatus, adjacent the roller 26, but fixed with relation to the framework 10.

Figure 3:
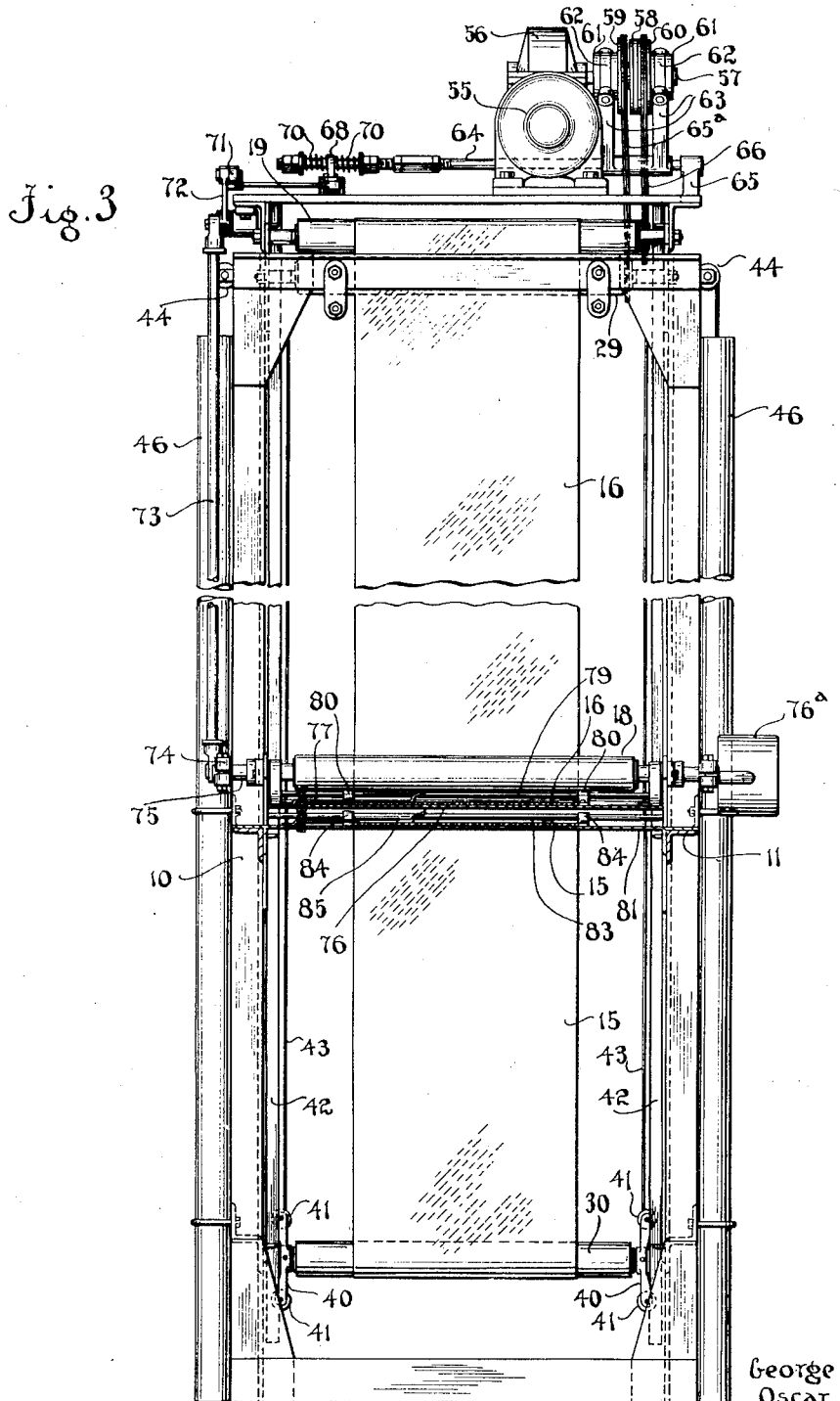
Figure 3 is a section on the line 3—3 of Figure 1.

The floating rollers 30, 32 are journaled in end-frames 40, 40 (Figure 3) each of which is provided with two pairs of guide rollers, the rollers 41, 41 of each pair being positioned one above the other, and each engaging a V-shaped grooved vertical guide 42, with a double bearing to prevent binding of the end-frames, the arrangement being such as to maintain the rollers 30, 32 in alignment in a horizontal plane. Cables 43, 43 attached to the respective end-frames 40 pass over respective sheaves 44 journaled in the top of the framework 10 and carry counterweights 45, which move in tubular guides 46, the arrangement being such that but slight pull is required to raise the floating rollers 30, 32.

In like manner the floating rollers 21, 23 are carried in end-frames 48, as illustrated in Figure 1, each of which is provided with pairs of guide rollers 48$^a$, 48$^a$ that ride in guides 49, 49. Each guide 49 comprises a V-shaped track affording a groove in which each of the guide rollers may have a double bearing to prevent binding of the roller frame. The end-frame is provided with a counterweight 50, connected thereto by cable 51, and moving in a tubular guide 52.

For driving the respective feed rollers 20, 29 alternatively to feed fabric strips 15 or 16 into their respective festoons, a motor 55 is mounted upon the top of the framework 10 and directly connected to a reduction gear device 56 that is provided with a laterally extending, horizontal shaft 57 upon which is fixedly mounted a disc 58 having its lateral faces covered with friction material, such as leather. Loosely journaled for axial movement upon the shaft 57, on opposite sides of the disc 58, are sprockets 59, 60, which are formed with respective hubs 61 on their outer faces, said hubs being grooved to receive respective collars 62 that are engaged by respective forked arms 63, the latter being connected to a push-rod 64 that is slidably supported at one end in a bracket 65. The arrangement is such that by longitudinal movement of the push-rod 64, one or the other of the sprockets 59, 60 is moved into frictional driving engagement with the disc 58. Sprocket 59 is connected by sprocket chain 65$^a$ to a suitable sprocket on the roller 29, and sprocket 60 is connected by sprocket chain 66 to a suitable sprocket on the roller 20. The motor 55 is controlled by a start and stop switch 66 which for convenience may be mounted upon the frame-extension 11, although supplemental means, presently to be described, is provided for automatically stopping the motor.

For effecting longitudinal movement of the push-rod 64 the opposite end thereof from the bracket 65 is slidably mounted in the end of one arm of a bell-crank lever 68 that is pivotally mounted at 69 upon the top of the framework 10, there being compression springs 70, 70 mounted upon the push-rod at each side of the bell-crank arm so that the sprockets 59, 60 may be yieldingly urged against the disc 58. The other arm of the bell-crank 68 is connected to one end of a link 71 that has its other end connected to one arm of a bell-crank 72, the other arm of which is connected to a downwardly extending rod 73 that has its lower end connected to the free end of a lever 74, the latter being mounted upon one end of a shaft 75 that is journaled in the frame-extension 11. The shaft 75 also has the roller 18 journaled thereon.

Secured to the shaft 75 and extending therefrom over the frame-extension 11 is a splicing plate 76 adapted alternatively to be disposed in the two positions shown, in full lines and broken lines respectively, in Figure 1. In the two positions shown the shaft 75 is so angularly positioned as to control, through the instrumentalities just described, the relation of the sprockets 59, 62 to the disc 58, and consequently to determine which of the feed rollers 20, 29 has driving connection with the motor 55. In its lowered, full-line position the splicing plate 76 is utilized for supporting the trailing end of the fabric strip 16 while the leading end of a short length of fabric, indicated at 77, is adhesively attached thereto. A spring clip 78 is mounted upon one marginal portion of the splicing plate for holding the trailing end of the strip 16 thereon while the splicing plate is in its elevated, broken-line position.

A guide rod 79 carrying lateral guide members 80, 80 for the fabric strip may be mounted upon the splicing plate 76 if desired. The shaft 75 also carries a counterweight 76$^a$ for balancing the weight of the splicing plate 76 so that the latter will remain in elevated position after being so positioned.

Upon the top of the frame-extension 11 is a splicing table 81 upon which the trailing end of the fabric strip 15 rests while the leading end of a short length of fabric is adhesively attached thereto. Preferably a roller 82 is journaled in the outer end of the extension 11 to facilitate the movement of fabric over the table 81, and a guide rod 83 provided with lateral guide members 84, 84 may be mounted upon the table adjacent the roller 18. A spring clip 85 also is mounted upon the table 81, adjacent the guide rod 83 for anchoring the trailing end of the strip 15 to said table.

Mounted below the table 81, in front of the splicing plate 76 and adjacent thereto, is a pivotally mounted mercury switch 86 that has an arcuate operating lever 87 normally projecting above the surface of the table 81 through a suitable slot therein, the structure being so balanced that the weight of a length of fabric upon said lever 87 is sufficient to depress the same. The mercury switch 86 is in the electrical circuit controlling the motor 55, and is so arranged that when the operating lever 87 is depressed, as by the weight of a length of fabric on the table, the circuit is closed and the motor can be started, the switch resuming its normal, open position and stopping the motor when the trailing end of the strip of fabric passes off the operating lever.

The extension 12 at the delivery end of the rack comprises side plates 90, 90 that are suitably braced by cross-rods 91, 91 and each side plate has an angular end-stop 92 at its outer end. At their inner ends the side plates 90 are mounted upon respective angles 93, 93 that are vertically adjustable upon the frame 10 by means of slots 94, 94 and bolts 95, 95, the arrangement permitting the entire structure 12 to be accurately positioned vertically with relation to the tire building drum 14.

Each side plate 90 is formed with an upper and a lower longitudinal groove 96 and 97 respectively, the grooves 97 being substantially horizontal and the grooves 96 being slightly downwardly inclined toward the front end. Slidably supported by the grooves 96, 97 are carriages 98, 99 respectively, each of which comprises a plurality of transverse supports 100, 100, upon the end portions of which are journaled rollers 101, 101 that fit within the grooves 96, 97 of the side plates 90, the supports 100 carrying trays 102, 102 of somewhat less width than the length of said supports. Each tray 102 is provided at its front end with laterally disposed brackets 103, 103 which carry a supporting rod 104 upon which is mounted a pair of adjustable guide-blocks 105, 105 adapted to position a strip of material 15 or 16 passing over the tray by engaging the margins thereof, the supporting rod 104 being spaced from the tray so that the fabric strip may pass thereunder.

The transverse supports 100 of the respective carriages 98, 99 are disposed considerably to the rear of the front edges of the trays 102, the arrangement permitting the carriages to be moved forward until the trays extend a considerable distance beyond the front of the extension 12, as indicated in broken lines in Figure 4, in which position the front edges of the trays are adjacent the tire building drum 14. Forward movement of the carriages toward the drum 14 is limited by the end-stops 92, and in their advanced, broken line positions the trays 102 are disposed substantially tangential to the top of said drum.

The retracted, inner position of the carriages 98, 99 is defined by end-stops 108, 108 that are mounted upon the respective side plates 90 at the rear thereof, said end-stops being so shaped as to stop the lower carriage 99 somewhat in advance of the upper carriage 98 so that it is more easily grasped by an operator. The upper carriage will remain stationary in its retracted position due to friction, the downward inclination of the grooves 96 not being sufficient to overcome said friction.

The roller 26 is journaled in end-brackets 110, 110 that are carried by the tray 102 of the upper carriage 98, at the rear edge thereof. The roller 36 is journaled in the end-stops 108, adjacent the rear end of the lower carriage 99.

In the operation of the device, an operator working at the table 81 receives short lengths of bias-cut fabric, such as the fabric strip 77, from a convenient source of supply (not shown), places the fabric strip upon the table whereby the lever 87 of the switch 86 is depressed to close said switch, and then splices the end of the strip to the trailing end of strip of material 16, the latter being positioned on the splicing plate 76, and the splicing plate being in the lowered position shown in full lines in Figure 1.

The operator then swings the spring clip 78 to one side to release the strip 16 and then presses the starting button of switch 66, thus starting the motor 55 and driving the feed-roller 20 whereby the strip 16 is fed into its festoon, the weight of the floating frame 48 and rollers 21, 23 serving to equalize the length of the respective loops of the festoon. As the feed of the strip 16 moves its trailing end forward over the table 81, the trailing end of the strip passes off the lever 87 of the switch 86 and permits the latter to resume its normal open position whereby the motor circuit is opened and the motor stops. The momentum of the motor carries the trailing end of the strip 16 onto the splicing plate 76 to which the operator secures it by means of the spring clip 78.

The operator then raises the splicing plate to the position shown in broken lines in Figure 1 which automatically shifts the sprockets 59, 60 so that the feed-roller 29 is in driving engagement with the motor 55. The operations of splicing a length of material to the strip 16 are then repeated upon strip 15, and the latter fed forward into its festoon, the feed of the strip automatically stopping as hereinbefore explained. The operations described are repeated as often as is necessary to keep an adequate supply of material in the festooning rack.

At the delivery end of the rack the tire builder draws out either carriage 98 or 99 as required, attaches the leading end of strip 15 or 16 thereon to the tire-building drum 14, and then drives the latter to withdraw the strip material from its festoon and wrap it about said drum.

Figure 2:
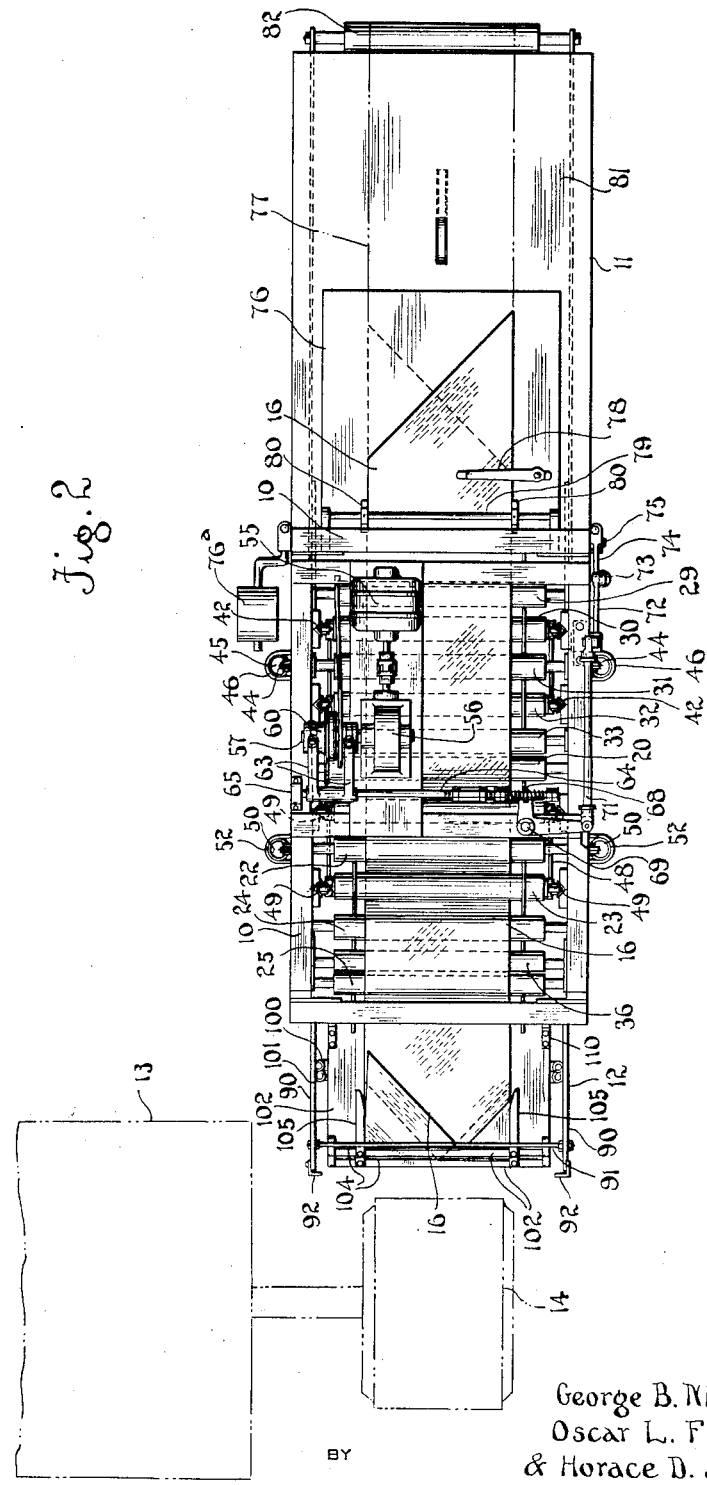
Figure 2 is a plan view thereof.

When the required amount of either strip is wrapped about the drum, the strip is severed and the end thereof laid back over the guide rod 104 onto itself as is most clearly shown in Figure 2. The carriage is then pushed back to its retracted, inoperative position, the slight surplus of fabric thus created being drawn back into the festoons by the weight of the floating rollers and their frames. The anchoring of the leading ends of the strips 15, 16 to the rods 104 prevents the strips from being drawn back off the carriages.

The automatic features of the rack make for economical, rapid and facile operation thereof. The feature of a festooning rack carrying two kinds of strip material enhances the utility thereof, and the movable carriages at the delivery end of the apparatus are conveniently manipulated by the tire builder, and assure the proper positioning of the strip material upon the tire building drum.

The apparatus may be modified within the scope of the appended claims which are not limited wholly to the specific construction shown and described.

What is claimed is:

1. In a festooning rack, the combination of fixed and floating rollers adapted to support a length of strip material in a plurality of loops, means for driving at least one of the fixed rollers to feed material into said loops, and a reciprocable guide tray at the delivery side of the rack over which the strip material is intermittently drawn, said tray being adapted to be projected during the guiding of material from said festooning rack and to be retracted during intermissions in the feeding of the material from the rack, the weight of the floating rollers preventing the accumulation of surplus strip material on the tray during the manipulation thereof.

2. In a festooning rack, the combination of two series of fixed and floating rollers adapted to support respective lengths of strip material in festoons, means for alternatively driving at least one of the fixed rollers of each series of rollers to feed respective continuous strips of material into the festoons, and respective delivery trays at the delivery end of the rack for the strips of material, said trays being disposed one above the other and slidable toward and away from the rack.

3. In a festooning rack, the combination of a plurality of series of fixed and floating rollers, each series of which is adapted to support a length of strip material in festoons, and means common to the several series of rollers for driving at least one of the fixed rollers thereof to feed respective strips of material into the festoons.

4. A combination as defined in claim 3 including means for selectively driving the driven rollers of any series of rollers.

5. In a festooning rack, the combination of two series of fixed and floating rollers adapted to support respective lengths of strip material in festoons, means for driving at least one of the fixed rollers of each series of rollers to feed strip material into the festoons, a splicing plate pivotally mounted at the receiving end of the device, and means so connecting the splicing plate to the driving means that the angular position of the splicing plate controls the operation of said driving means.

6. A combination as defined in claim 5 in which the connection between the splicing plate and driving means is so constructed and arranged that the respective feed rollers of the festoons are driven alternatively according to the angular position of the splicing plate.

7. In a festooning rack, the combination of two series of fixed and floating rollers adapted to support respective lengths of strip material in festoons, means for driving at least one of the fixed rollers of each series of rollers to feed material to the festoons, clutch means between the driven rollers and the driving means, a splicing plate at the receiving end of the device having alternative positions, and means connecting the splicing plate to said clutch means for controlling the operation of the latter.

8. A combination as defined in claim 7 in which the driving means is common to the two series of rollers.

9. A combination as defined in claim 7 in which the splicing plate is pivotally mounted, and has operative and inoperative positions which control the operation of the clutch means.

10. In a festooning rack, the combination of a plurality of series of fixed and floating rollers adapted to support respective lengths of strip material in festoons, means for selectively driving at least one of the fixed rollers of each series to feed strip material into the festoons, and means for automatically stopping the feeding movement of a driven roller when the trailing end of the strip material being fed reaches a determinate position.

11. In a festooning rack, the combination of two series of fixed and floating rollers adapted to support respective lengths of strip material in festoons, means common to the two series of rollers for driving at least one of the fixed rollers of each series to feed material into the festoons, selectively operable clutch means controlling the driving of said rollers, means for actuating the driving means, and automatic means for stopping the driving means when the trailing end of the material being fed reaches a determinate position.

12. In a festooning rack, the combination of two series of fixed and floating rollers supporting respective lengths of strip material in festoons, means for selectively driving at least one of the fixed rollers of each series to feed material into the festoons, a splicing table at the receiving end of the device, means thereon for holding the trailing end of one length of material, a splicing plate pivotally mounted over the splicing table, means thereon of holding the trailing end of the other length of material, and means connecting the splicing plate to the driving means whereby the position of the plate controls the selective driving of the feed rollers.

13. In a strip material supplying device, the combination of means for supporting a supply of strip material, and a reciprocable guide tray at the delivery side of the device over which the strip material is intermittently drawn, said tray being adapted to be projected during the guiding of material from said device and to be retracted during intermissions in the feeding of the material from the device.

14. In a strip material supplying device, the combination of means for supporting a plurality of respective lengths of strip material, and delivery mechanism at the delivery end of the device, said delivery mechanism comprising a plurality of reciprocable guide trays which converge toward their outer ends, and over which the strip material is intermittently drawn for guiding the leading ends of the respective strips of material said trays being adapted to be alternately projected during the guiding of material from said device and to be retracted during intermissions in the feeding of the material from the device.

15. A combination as defined in claim 14 including means for securing the leading ends of the strips of material to the respective carriages.

16. In a festooning rack, the combination of a plurality of series of fixed and floating rollers supporting respective lengths of strip material in festoons, means for feeding material selectively into said festoons, and delivery mechanism at the delivery end of the rack, said delivery mechanism comprising carriages movable toward and away from the rack and adapted to carry the leading ends of the respective strips of material, guide-rods traversing the forward ends of said carriages, above the surface thereof, and lateral guides for the strip material adjustably mounted upon said guide-rods.

17. In a festooning rack, the combination of a series of fixed rollers and a floating roller supporting a length of strip material in a festoon, end-frames for said floating roller, pairs of guide rollers mounted on said end-frames, and V-shaped tracks for guiding said guide rollers during the raising and lowering of said floating roller.

18. In a festooning rack, the combination of a series of fixed rollers and a floating roller supporting a length of strip material in a festoon, end-frames for said floating roller, pairs of guide rollers mounted on said end-frames, mechanism at the delivery end of the rack for withdrawing the strip material from the festoon, thus raising the floating roller with its end carriages, mechanism at the receiving end of said frame for feeding additional strip material to said festoon, thus lowering the floating roller with its end carriages, and V-shaped tracks for guiding said guide rollers during the raising and lowering of said floating roller.

19. In a festooning rack, the combination of a series of fixed rollers and a pair of floating rollers supporting a length of strip material in a festoon, end-frames connecting said pair of floating rollers, a pair of guide rollers mounted on said end-frame at each end of each floating roller, and a pair of tracks at each side of the festooning rack for guiding said pairs of guide rollers during the raising and lowering of said floating rollers.

GEORGE B. NICHOLS.
OSCAR L. FLENER.
HORACE D. STEVENS.